March 28, 1967  S. A. BACON  3,311,401
CONCRETE BUCKET HOOK ASSEMBLY
Filed Dec. 13, 1965
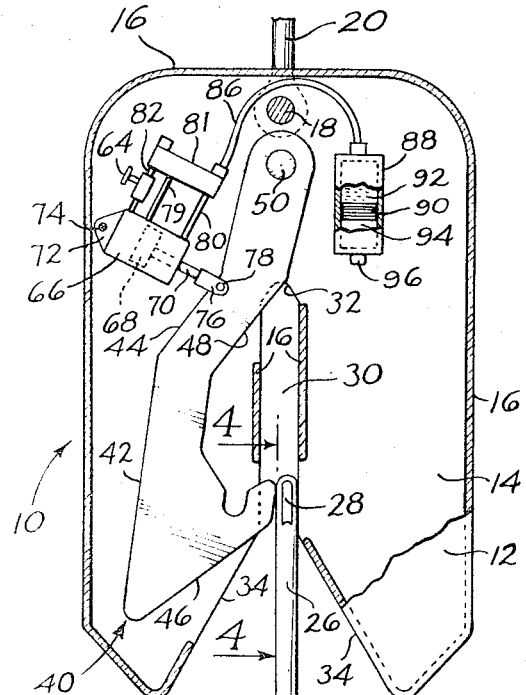
Fig. 1.
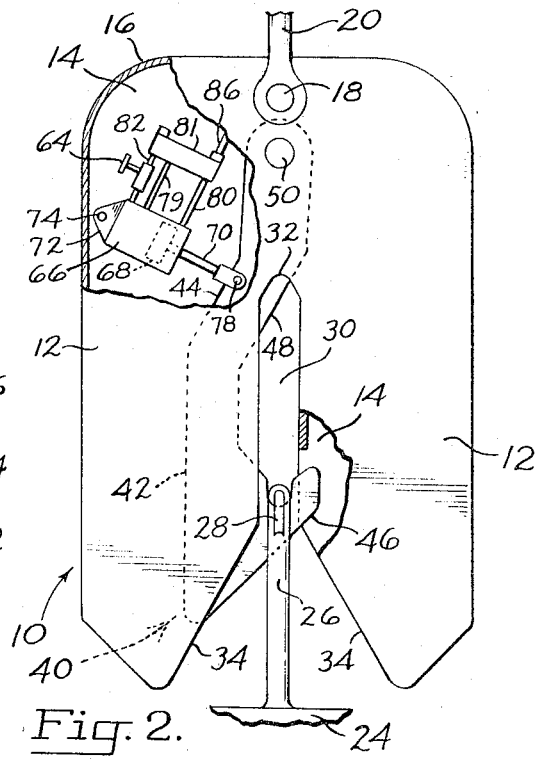
Fig. 2.
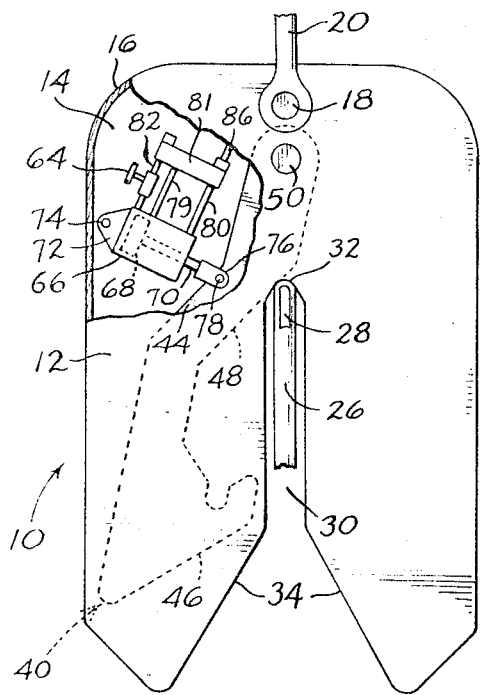
Fig. 3.
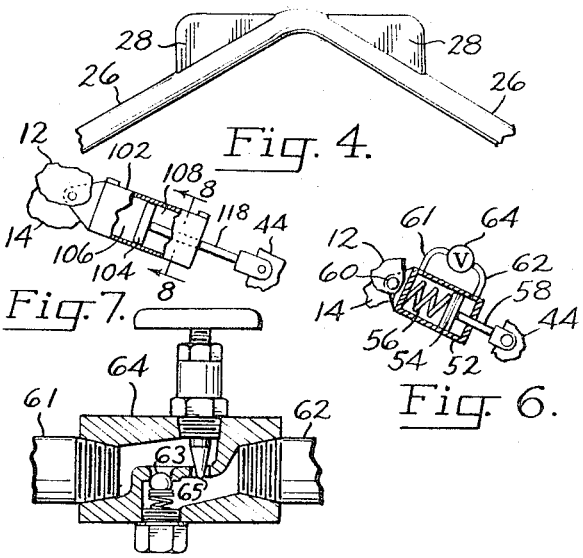
Fig. 4. Fig. 7. Fig. 6. Fig. 5. Fig. 8.
Stuart A. Bacon
INVENTOR
BY Eugene D. Farley
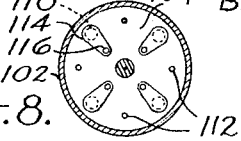
Atty.

United States Patent Office 3,311,401
Patented Mar. 28, 1967

3,311,401
CONCRETE BUCKET HOOK ASSEMBLY
Stuart A. Bacon, 1078 Chenowith Road,
The Dalles, Oreg. 97058
Filed Dec. 13, 1965, Ser. No. 513,231
10 Claims. (Cl. 294—83)

This invention relates to hook assemblies for use in lifting with a hoist the drop-bottom buckets employed in pouring concrete.

It is the general object of the present invention to provide a concrete bucket hook assembly which may be engaged with and disengaged from a concrete bucket easily and in a minimum of time; which is positive in its action; which is versatile in its use with conrete buckets of diverse size and type; which may be used safely with heavy loads; and which operates automatically without requiring special manipulation by the hoist operator each time the hook is engaged and disengaged.

Generally stated, the hook assembly of my invention comprises a frame having a central vertical guideway dimensioned to receive the bail of a concrete pouring bucket. Connecting means are provided on the frame for connecting it to the hoist by which it is raised and lowered between bail-engaging and bail-releasing positions.

A hook laterally dimensioned to span the guideway and having an elongated shank is attached pivotally to the frame above the guideway. The pivotal attachment of the hook permits its oscillation between a closed position wherein it overlies the guideway and an open position wherein it is displaced therefrom.

First cam means are present on the hook overlying the lower portion of the guideway when the hook is in its closed position. This cam means is operable by the bail when the bucket is lowered to shift the hook to a first open position permitting advancement of the bail into the guideway.

Second cam means are provided on the hook shank overlying the upper portion of the guideway when the hook is in its first open position. The second cam means is operable by the bail as it advances further into the guideway to shift the hook to a second open position.

Detent means are coupled to the hook. Such means are operable to restrain the oscillation of the hook from its open to its closed position for a time predetermined to permit withdrawal of the hook from the bail.

Thus, in use, the hook is lowered until the bail enters the guideway. Thereupon it contacts the first cam means which swings the hook to one side, permitting entry of the bail into the guideway. Thereupon the hook gravitates, or is driven, back to its closed position in which it may be used to lift the bucket and transport it to the desired location.

When it is desired to release the bucket from the hook assembly, the bucket is rested on the ground and the hook lowered until the bucket bail contacts the second cam means. This moves the hook to its position of extreme displacement, fully opening the guideway. The hook then is raised until it clears the bail. During this operation, the detent means retards the oscillation of the hook to its normally closed position, affording sufficient time for complete removal of the hook from the bail.

Considering the foregoing in greater detail and with particular reference to the drawings, wherein:

FIGS. 1, 2 and 3 are views in side elevation of the herein described hook assembly fully or partly in section, FIG. 1 illustrating the bucket-loading position of the hook, FIG. 2, the bucket-carrying position of the hook, and FIG. 3 the bucket-releasing position of the hook;

FIG. 4 is a fragmentary view in side elevation of the bucket tail;

FIG. 5 is a fragmentary detail view in longitudinal section illustrating alternate detent means for use in controlling the movement of the hook component in the herein described concrete bucket hook assembly;

FIG. 6 is a longitudinal sectional view of a special valve which may be used to advantage in the assemblies of FIGS. 1–3 and of FIG. 6; and FIGS. 7 and 8 are longitudinal and transverse sectional views, respectively, of yet another type of detent means which may be used in controlling the movement of the hook component of the assembly of the invention.

As seen in FIGS. 1, 2 and 3, the presently described concrete bucket hook assembly is contained in a massive housing indicated generally at 10. The housing is of sufficient strength to handle pouring buckets containing from ½ to 12 cubic yards of concrete. It is generally rectangular in outline and may measure, for example, 4 x 6 feet or even more.

Housing 10 includes a face plate 12 and a back plate 14 maintained in spaced relation by means of side and end plates 16. The upper central portions of the two plates are provided with registering openings dimensioned to receive a pin 18 and clevis 20 by means of which the hook assembly is coupled to the cable of a hoist.

The hook assembly is designed for use with a concrete pouring bucket indicated fragmentarily at 24 in FIG. 1. The bucket may be of the usual type, sufficiently large to accommodate several yards of concrete, and provided at its bottom with trap doors by means of which it may be emptied.

It is provided also with a rigid upstanding bail 26. This is angular in configuration as shown in FIG. 4, but preferably is provided with a pair of guide plates 28 which squares off its contour and facilitate its engagement by means of the hook assembly.

The frame is provided with a central guideway 30 which, when the hook assembly is in its vertical use position, also is positioned vertically. Guideway 30 has a width which is greater than the diameter of bail 26 which it is designed to contain. Its inner extremity is provided with a socket 32 which is arcuate in configuration and on a radius substantially the same as the radius of bail 26. Accordingly it serves a locating function as will appear hereinafter.

The outer extremity of guideway 30 is defined by converging guiding segments 34. These make it easier for the crane operator to guide the bail into guideway 30 as he lowers the hook assembly upon the bail.

The hook assembly also is provided with a hook indicated generally at 40 and including a head or hook portion 42 and an elongated shank 44. Hook portion 42 has a lateral dimension sufficient to span the lower part of guideway 30 which it normally overlies. It also is provided with an exterior cam surface 46 arranged and positioned at a suitable angle to engage, and be actuated by, bail 26 when the latter enters the guideway.

Shank portion 44 of the hook is provided with a cam surface 48. This is positioned and arranged to overlie the upper part of guideway 30 and particularly to intersect socket 32 at the inner end of the guideway. It thus is engaged and actuated by bail 26 when the latter has penetrated guideway 30 to the inner extremity thereof.

Pivotal attaching means are provided for attaching the upper end of hook shank 44 to the frame above guideway 30, thus permitting the oscillation of the hook between a closed position wherein overlies the guideway and an open position wherein it is displaced therefrom. The pivotal attaching means provided for this purpose comprises a pin 50 which penetrates not only side faces 12, 14 of the hook assembly frame but also the upper end of shank 44 of hook 40.

Because of its size, weight and position hook 40 normally will gravitate to the closed position of FIG. 2.

However, combination drive means and detent means are provided for positively moving the hook to its closed position, as well as for detaining it in its open position for a predetermined time interval. Various types of units may be employed for this purpose.

In the simplified embodiment of FIG. 6 there is provided an hydraulic cylinder 52 filled with hydraulic fluid. The piston 54 of the cylinder is spring-pressed by coil spring 56. The piston rod 58 of the cylinder is pivoted to hook shank 44. The upper end of the cylinder case is provided wtih a perforated tab by means of which the cylinder may be pivotally attached to housing plates 12, 14 by pivot pin 60.

Conduits 61, 62 interconnect the two chambers of the cylinder defined by piston 54. A combination check and bleeder valve 64 is in series with the conduits. This valve has a spring-pressed, ball check valve component 63 of fixed but relatively high flow capacity and a metering needle valve component 65 of relatively low, adjustable flow capacity.

Accordingly, when the hook assembly is lowered on the bail, hook 40 moves to the left against the compression of spring 56 at a rapid rate determined by the capacity of the check valve component 63 of valve 64. Then when the hook assembly is lifted and the driving force removed, spring 56 forces hook 40 back to its normal position at a delayed rate determined by the orifice setting of the bleeder valve component 65 of valve 64.

Second detent means for controlling the movement of hook 40 is illustrated in FIGS. 7 and 8.

In this embodiment, an hydraulic cylinder 102 is filled with hydraulic fluid. Piston 104 divides the cylinder into two fluid-filled chambers 106, 108.

The piston serves a valving function, and to this end is provided with large transverse ports 110 as well as with transverse orifices 112 of restricted, predetermined size. Resilient, reed-type spring leaf closures 114 seat across ports 110, being secured to the piston by screws 116.

Piston rod 118 of the cylinder is pivoted to hook shank 44. The upper end of the cylinder case is pivoted to housing plates 12, 14.

In operation, when the hook assembly is lowered on the bail 26, hook 40 is forced out of guideway 30. This drives piston 104 to the left, as viewed in the drawings. The motion of the piston is rapid, since spring valve closures 114 are forced open by the fluid pressure, permitting fluid to flow rapidly through ports 110.

However, when the hook assembly is lifted from the bail, permitting hook 40 to gravitate to its rest position, overlying guideway 30, closures 114 snap shut, closing ports 110 and forcing the fluid to pass through orifices 112.

Since these orifices are of restricted size, piston 104 moves slowly to the right at a rate determined by the size of the orifices. This in turn retards the gravitational return movement of hook 40 sufficiently to afford a time interval permitting removal of the hook assembly from the bail.

A detent arrangement which permits acceleration of the bucket unloading sequence is provided in the preferred embodiment illustrated in FIGS. 1, 2 and 3.

In the embodiment of these figures an hydraulic cylinder 66 includes a piston 68 and a piston rod 70. The upper end of the cylinder is provided with a perforated tab 72 by means of which the cylinder pivotally is attached to frame plates 12, 14 by means of pivot pin 74.

The leading end of piston rod 70 is provided with perforated plate 76 by means of which the piston rod pivotally is attached to shank 44 of hook 40 by means of pivot pin 78.

Cylinder 66 is provided with three ports: one at the forward end ahead of the piston in its position of maximum displacement of FIG. 2, one at the rearward end behind the piston in its position of maximum retraction of FIG. 3, and one in an intermediate position. These are termed herein the forward, rearward and intermediate ports.

Conduits 79, 80 interconnect the forward and intermediate ports through a manifold 81. A conduit 82 interconnects the intermediate and rearward ports, also through manifold 81. A combination check and bleeder valve 64, of adjustable bleeding capacity as described above, is included in conduit 82.

A flexible conduit 86 interconnects manifold 81 and a pressure reservoir or accumulator 88. The accumulator is divided by floating piston 90 into an oil chamber 92 and compressed air chamber 94. Oil chamber 92, as well as the entire hydraulic system including cylinder 66, manifold 81, and conduits 79, 80, 82 and 86 are filled with hydraulic fluid. Air chamber 94 is filled with air charged at a predetermined pressure through plug 96.

In the operation of the FIGS. 1–3 form of the invention, hook assembly 10 is lowered onto bail 26 of a fully loaded concrete bucket 24. Guiding segments 34 guide the assembly until the upper portion of the bail contacts cam surface 46, moving the hook to the partly displaced position of FIG. 1. During such movement piston 68 of cylinder 66 moves from the advanced position of FIG. 2 to the partly retracted position of FIG. 1. Since during such movement fluid can flow freely through conduits 79, 80, the described movement of hook 40 can occur rapidly.

Lowering of the hook assembly is continued until bail 26 is fully within guideway 30. The resilient air pressure generated by the flow of fluid into the fluid side of accumulator 88 thereupon advances piston 68, moving hook 40 to the closed position of FIG. 2. This is the operative position of the hook in which the bucket is lifted, transported, tripped and otherwise used in its normal manner.

When it is desired to disconnect the bucket from the hook, the operation of FIG. 3 is employed. The hook assembly is lowered until bail 26 of the bucket has reached its extreme position, seated in socket 32 at the inner end of guideway 30. In reaching this position it engages cam surface 48, displacing hook 40 and piston 68 to the fully retracted position of FIG. 3.

The first portion of such movement, i.e. movement from the hook position of FIG. 2 to the hook position of FIG. 1, occurs rapidly because of the free flow of fluid through conduits 79, 80 and manifold 81.

The final portion of such movement, i.e. movement from the hook position of FIG. 1 to the hook position of FIG. 3 still occurs rapidly even though piston 68 seals off the intermediate port of the cylinder so that the flow of fluid must occur through line 82, which includes valve 64. This is for the reason that the fluid flow is through the high capacity check valve component 63 of valve 64.

However, the reverse movement of the hook occuring when the hook is lifted from the bail, is delayed, since the check valve component 63 of valve 64 is closed, forcing the fluid to pass through the adjustable, restricted bleeder valve component 65 thereof.

This delay is used to advantage in releasing the hook from the bucket bail. If the hook assembly is elevated while hook 40 is in its FIG. 3 position, it may be removed entirely from bail 26 because of the time lapse occurring before sufficient fluid is forced by the gas pressure developed in reservoir 88 through the bleeder valve component 65 of valve 64 and into cylinder 66 behind the piston. Normally a time interval of 5 or 6 seconds suffices to achieve the desired purpose.

As soon as the piston has cleared the intermediate cylinder port, there then will occur free passage of hydraulic fluid through conduits 79, 80 so that the hook rapidly assumes its FIG. 2 position, ready for another cycle of use.

It accordingly will be seen that there is provided an apparatus in which the several objects of this invention are achieved and which is well adapted for the conditions of practical use.

It is to be understood that the forms of my invention herein shown and described are to be taken as preferred examples of the same and that various changes in the shape, size and arrangement of parts may be resorted to without departing from the spirit of my invention or the scope of the subjoined claims.

Having thus described my invention, I claim:

1. A hook assembly for use in lifting a concrete bucket provided with a rigid bail, the hook assembly comprising:
   (a) a housing provided with a central vertical guideway dimensioned to receive the bucket bail,
   (b) connecting means on the housing for connecting the same to a hoist for raising and lowering the hook assembly between bail-engaging and bail-releasing positions,
   (c) a hook laterally dimensioned to span the guideway and having an elongated shank,
   (d) pivotal attaching means for attaching the hook shank to the housing above the guideway permitting oscillation of the hook between a closed position wherein it overlies the guideway and open positions wherein it is displaced therefrom,
   (e) first cam means on the hook overlying the lower portion of the guidway when the hook is in its closed position and operable by the bail when the hook is lowered to shift the hook to a first open position permitting advancement of the bail into the guideway,
   (f) second cam means on the hook overlying the upper portion of the guideway when the hook is in its closed position and operable by the bail as it advances further into the guideway to shift the hook to a second open position; and
   (g) detent means coupled between the hook and housing operable to restrain the shifting of the hook from its open to its closed position for a time predetermined to permit withdrawal of the hook from the bail.

2. The hook assembly of claim 1 wherein the guideway has the contour of an inverted Y to facilitate entry of the bail.

3. The hook assembly of claim 1 wherein the detent means comprises resilient detent means operable further to return the hook to its closed position after each displacement.

4. The hook assembly of claim 1 wherein the detent means comprises a fluid-filled hydraulic cylinder including an orificed piston fitted with high capacity check valve means operable to pass fluid when the hook moves from its closed to an open position, the orifices being operable to pass fluid at a reduced rate when the hook moves from an open to a closed position.

5. The hook assembly of claim 1 wherein the detent means comprises resiliently-pressed hydraulic cylinder means.

6. The hook assembly of claim 1 wherein the detent means comprises spring-pressed hydraulic cylinder means.

7. The hook assembly of claim 1 wherein the detent means comprises gas-pressured, resiliently hydraulic cylinder means.

8. The hook assembly of claim 1 wherein the detent means comprises gas-pressured, resilient hydraulic cylinder means including an hydraulic cylinder in series flow with combination check and bleeder valve means arranged to cause rapid fluid flow through the cylinder as the hook is moved from its closed to its second open position, reduced fluid flow through the cylinder as the hook is moved from its second open position to its first open position and rapid flow through the cylinder as the hook is moved from its first open position to its closed position.

9. The hook assembly of claim 1 wherein the first cam means comprises an angular lower edge surface of the hook.

10. The hook assembly of claim 1 wherein the second cam means comprises an angular upper edge surface of the hook shank.

References Cited by the Examiner

UNITED STATES PATENTS

| | | | |
|---|---|---|---|
| 3,164,406 | 1/1965 | Barry | 294—81 X |
| 3,167,345 | 1/1965 | Dukes | 294—83 |

GERALD M. FORLENZA, *Primary Examiner.*

G. F. ABRAHAM, *Assistant Examiner.*